US012553535B2

(12) United States Patent
Holmes et al.

(10) Patent No.: US 12,553,535 B2
(45) Date of Patent: Feb. 17, 2026

(54) SOLENOID VALVE ASSEMBLY AND METHOD OF OPERATING THE SAME

(71) Applicant: Solero Technologies, LLC, Water Valley, MS (US)

(72) Inventors: Garrett Holmes, Lake Orion, MI (US); Kyle A. F. Schmit, Oxford, MS (US); Brett Peglowski, Oakland, MI (US)

(73) Assignee: Solero Technologies LLC, Water Valley, MS (US)

( * ) Notice: Subject to any disclaimer, the term of this patent is extended or adjusted under 35 U.S.C. 154(b) by 178 days.

(21) Appl. No.: 18/139,649

(22) Filed: Apr. 26, 2023

(65) Prior Publication Data

US 2023/0349483 A1 Nov. 2, 2023

Related U.S. Application Data

(60) Provisional application No. 63/335,282, filed on Apr. 27, 2022.

(51) Int. Cl.
*F16K 31/06* (2006.01)
*F16K 27/02* (2006.01)

(52) U.S. Cl.
CPC ........ *F16K 31/0675* (2013.01); *F16K 27/029* (2013.01); *F16K 31/0655* (2013.01); *F16K 31/0658* (2013.01)

(58) Field of Classification Search
CPC .............. F16K 31/0675; F16K 27/029; F16K 27/0655; F16K 27/0658
USPC .................................................... 251/129.15
See application file for complete search history.

(56) References Cited

U.S. PATENT DOCUMENTS

| 4,074,700 A * | 2/1978 | Engle ................. F16K 31/0627 251/282 |
| 7,988,125 B2 * | 8/2011 | Cho ..................... F16J 15/3204 251/129.15 |
| 9,599,249 B2 * | 3/2017 | Holmes ............... F16K 31/0655 |
| 9,732,857 B2 * | 8/2017 | Jones .................. F16K 31/0655 |
| 9,970,552 B2 * | 5/2018 | Jones ..................... F16J 15/164 |
| 2019/0211767 A1 * | 7/2019 | Miyake ............... F16K 31/0655 |

(Continued)

OTHER PUBLICATIONS

Office Action issued by the German Patent Office for application 10 2023 110 852.2 on Jun. 6, 2025.

*Primary Examiner* — William M Mccalister
(74) *Attorney, Agent, or Firm* — Reising Ethington P.C.

(57) ABSTRACT

A solenoid valve assembly that controls the flow of fluids, such as those in electric, internal combustion engine and/or hybrid vehicles. The solenoid valve assembly may include a casing, a bobbin, a coil, a body, a pole piece, an armature, a spring, a primary seal, a secondary seal, and an electrical connection. In a closed state, the spring pushes the armature downwards against the body, thereby closing the primary seal. In an open state, electrical current is provided to the coil, which creates an electromagnetic field and magnetic flux that magnetically attracts and pulls the armature upwards to the pole piece, against the spring force, such that the primary seal is opened. A low clearance, extended length secondary seal is used in conjunction with the primary seal. The solenoid valve assembly may employ a peak-and-hold technique to maintain the primary seal in the open state, yet do so while drawing a minimum amount of electrical current.

15 Claims, 3 Drawing Sheets

(56) References Cited

U.S. PATENT DOCUMENTS

2021/0222795 A1* 7/2021 Lesage .................... H01F 7/081
2023/0349483 A1* 11/2023 Holmes ............... F16K 31/0655

* cited by examiner

SOLENOID VALVE ASSEMBLY AND METHOD OF OPERATING THE SAME

RELATED APPLICATION

The present application claims the priority of U.S. provisional application No. 63/335,282, filed Apr. 27, 2022, the entire contents of which are hereby incorporated by reference.

FIELD

The present disclosure generally relates to a valve assembly and, more particularly, to a solenoid valve assembly for controlling the flow of fluids, including liquids or gases.

BACKGROUND

A typical vehicle includes one or more hydraulic systems that control the flow of fluids, such as hydraulic fluids, transmission fluids, oils and/or other fluids and lubricants. Such hydraulic systems usually employ a number of solenoid valves, each of which includes an electrically controlled solenoid with a sliding armature that is magnetically attracted to a stationary pole piece.

Although such systems and valves are generally known, it may be desirable to provide an improved solenoid valve that can minimize fluid leakage, as well as draw a minimum amount of electrical current.

SUMMARY

According to one example, there is provided a solenoid valve assembly for controlling the flow of fluids, comprising: a casing; a bobbin and a coil at least partially surrounded by the casing, the coil is configured to establish an electromagnetic field when an electrical current flows through the coil; a body at least partially surrounded by the coil, the body includes an upper portion, a lower portion, an axial bore, and first and second ports; a pole piece stationarily located within the axial bore of the body, the pole piece includes a ferromagnetic material; an armature slidingly located within the axial bore of the body, the armature includes a ferromagnetic material; a spring biased to push the pole piece and the armature apart, the pole piece and the armature are configured to be magnetically attracted to one another against the bias of the spring when the electromagnetic field is established; a primary seal located between the first port and the second port, the primary seal includes a primary seal surface and a primary seal seat, the first port and the second port are in fluid communication with one another when the primary seal is open, and the first port and the second port are in fluid isolation from one another when the primary seal is closed; and a secondary seal established at a sliding junction between an outer surface of the armature and an inner surface of the axial bore of the body, wherein the secondary seal is a low clearance, extended length seal.

In accordance with various embodiments, the solenoid valve assembly may have any one or more of the following features, either singly or in any technically feasible combination:

the upper portion of the body acts as an electromagnetic core and includes a cutout, the cutout is located at an axial position along an outer surface of the body and helps establish separate magnetic poles within the body;

the lower portion of the body acts as a structural sleeve and includes a radial passageway connected to the first port and an axial passageway connected to the second port, the radial passageway is a fluid passageway or channel that circumferentially extends around at least a section of the lower portion and is in fluid connection with the first port, the axial passageway is a fluid passageway or channel that axially extends within at least a section of the lower portion and is in fluid connection with the second port;

the body further includes a radial groove located between an outer surface of the armature and an inner surface of the body, the radial groove circumferentially surrounds the armature and is a pressure centering groove so as to maintain the armature in a concentric alignment and provide a radially balanced design;

the pole piece includes an upper portion, a lower portion with a latching surface, and a closed axial bore, the spring is at least partially located within the closed axial bore of the pole piece;

the latching surface of the lower portion is an annular surface that circumferentially surrounds an opening to the closed axial bore, the latching surface magnetically attracts the armature and pulls the armature towards the pole piece when the electromagnetic field is established;

the latching surface is provided without any plating, surface coatings or surface layers to create a more intimate metal-to-metal interface with a corresponding latching surface of the armature thereby minimizing a physical separation between the opposing latching surfaces;

one of the body or the pole piece includes an annular sealing channel and an internal annular seal, the internal annular seal is located within the annual sealing channel and seals an internal fluid network within the solenoid valve assembly with just the internal annular seal;

the armature includes an upper portion with a latching surface and a lower portion, the latching surface of the upper portion is magnetically attracted to the pole piece and is pulled towards the pole piece when the electromagnetic field is established;

the upper portion of the armature further incudes a protruding boss that receives an end of the spring, an axial bore of the armature extends through the protruding boss so that pressurized fluid can flow through the armature and into a space located between the armature and the pole piece;

the upper portion of the armature further incudes an opening that receives an end of the spring, an axial bore of the armature extends through the opening so that pressurized fluid can flow through the armature and into a space located between the armature and the pole piece;

the primary seal seat is a circumferential surface located on an interior shoulder of the lower portion of the body, the primary seal surface is a circumferential surface located on a lower portion of the armature, the primary seal seat and the primary seal surface together form a corner-on-cone metallic seal;

the primary seal seat has a conical shape with a chamfer set at an angle of between 30°-50°, inclusive, and the primary seal surface has a radiused corner with a radius between 0.1 mm-0.3 mm, inclusive;

a radial clearance on each side of the secondary seal is less than 0.10 mm such that the secondary seal is low clearance;

a total axial length of the secondary seal is greater than 15 mm such that the secondary seal is extended length;

the secondary seal is a simple metal-to-metal sliding seal and does not include any sealing rings, pressure blocks, or other non-metal sealing components;

an engaging surface of a lower portion of the armature has a similar area as a latching surface of an upper portion of the armature so as to provide an axially balanced design, when pressurized fluid is introduced in an internal network of the solenoid valve assembly, the axially balanced design causes an axial force exerted against the engaging surface to offset an axial force exerted against the latching surface; and the solenoid valve assembly is configured such that: during a peak phase, a first amount of electrical current is conducted through the coil and a latching surface of the pole piece magnetically attracts a latching surface of the armature such that the latching surfaces contact one another and open the primary seal, and during a hold phase which follows the peak phase, a second amount of electrical current is conducted through the coil and the latching surfaces continue to contact one another such that the primary seal remains open, wherein the second amount of electrical current is less than the first amount of electrical current.

In accordance with another example, there is provided a method of operating a solenoid valve assembly, comprising the steps of: during a peak phase, conducting a first amount of electrical current through a coil and causing a latching surface of a pole piece to magnetically attract a latching surface of an armature such that the latching surfaces contact one another and open a primary seal; and during a hold phase which follows the peak phase, conducting a second amount of electrical current through the coil and causing the latching surfaces to continue to contact one another such that the primary seal remains open, wherein the second amount of electrical current is less than the first amount of electrical current, and a duration of the hold phase is greater than a duration of the peak phase.

In accordance with various embodiments, the method of operating a solenoid valve assembly may have the following step:

the first amount of electrical current during the peak phase is between 0.5 amps and 1.5 amps, inclusive, and the second amount of electrical current during the hold phase is between 0.1 amps and 0.4 amps, inclusive, and the second amount of electrical current is less than one-half of the first amount of electrical current.

DRAWINGS

Preferred embodiments will hereinafter be described in conjunction with the appended drawings, where like designations denote like elements, and wherein.

DESCRIPTION

A solenoid valve assembly is disclosed herein that can control the flow of fluids, including gases or liquids. The solenoid valve assembly is particularly well suited for controlling the flow of liquids, such hydraulic fluids, transmission fluids, oils and/or other fluids and lubricants used in transmission systems for electric vehicles, internal combustion engine vehicles and/or hybrid vehicles. According to one non-limiting example shown in FIG. 1, the solenoid valve assembly 10 may be installed on an electric vehicle EV to control the flow of oil from a sump S and pump P to one or more electric motor(s) M for purposes of cooling and/or lubricating the electric motor(s). It should be appreciated, however, that the solenoid valve assembly described herein may be used in any number of other applications, including applications unrelated to electric motors and/or vehicles.

Figure 1:
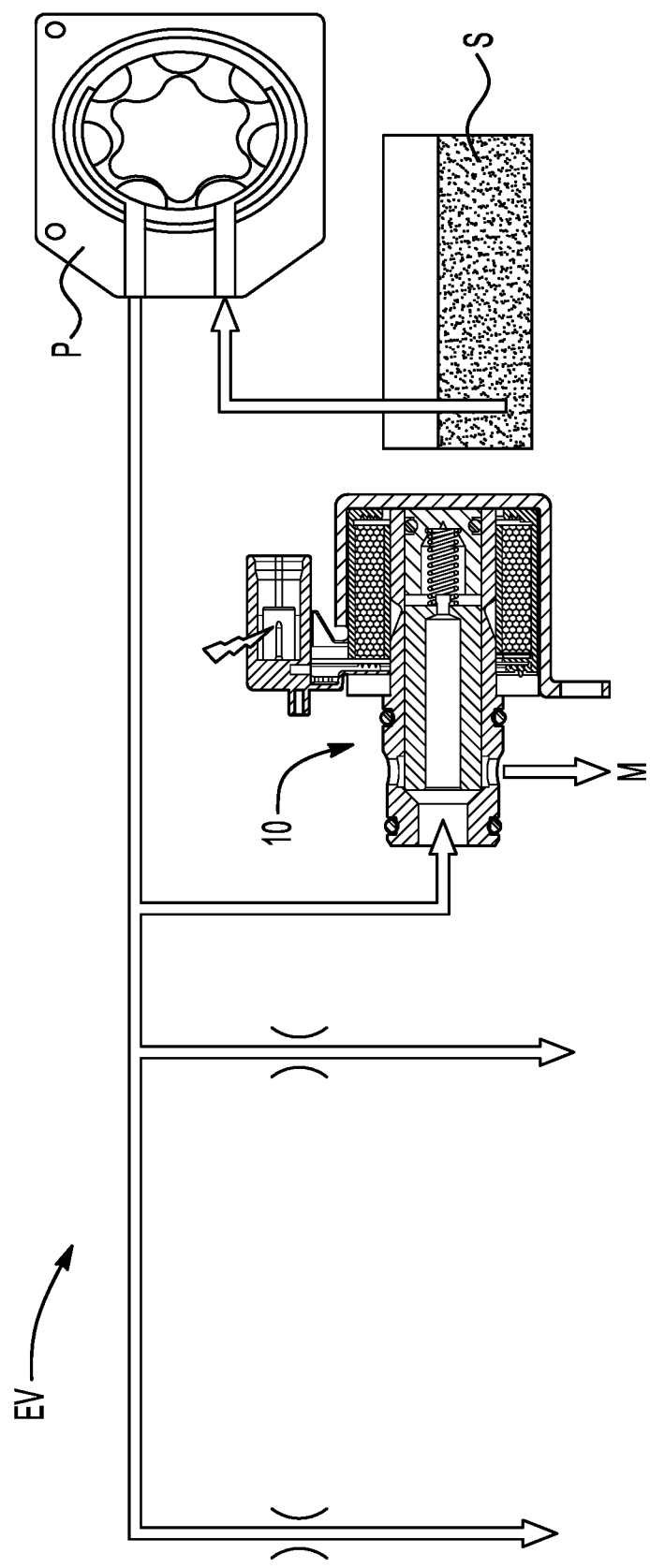
FIG. 1 is a schematic view of a motor cooling system that includes, among other devices, an example of a solenoid valve assembly.
Figure 3:
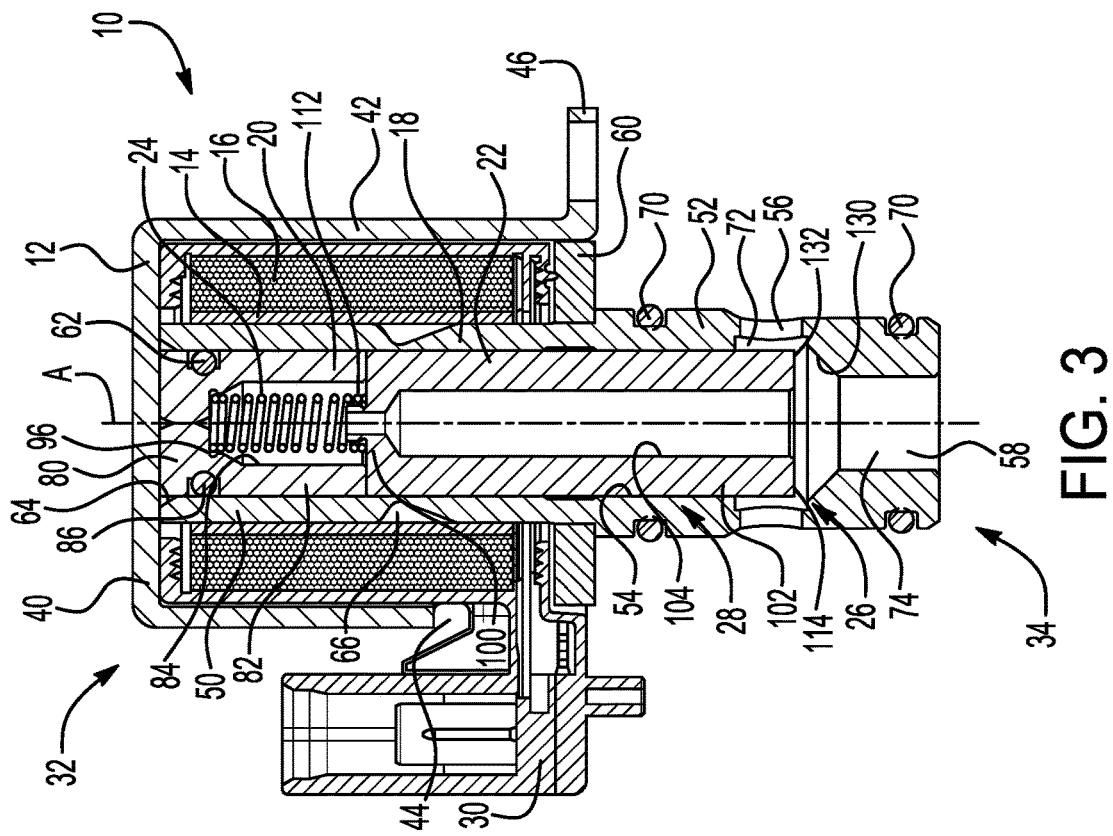
FIG. 3 is a cross-sectional view of the solenoid valve assembly of FIG. 1, where the solenoid valve assembly is in an open state.
Figure 2:
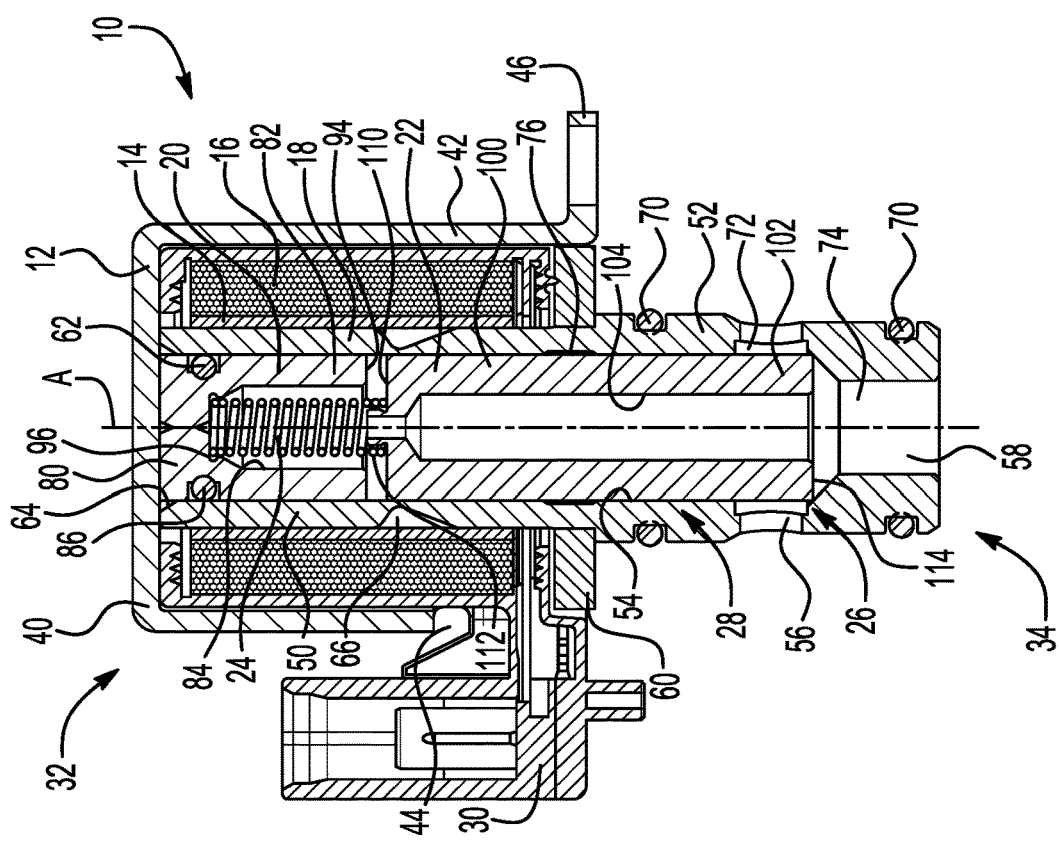
FIG. 2 is a cross-sectional view of the solenoid valve assembly of FIG. 1, where the solenoid valve assembly is in a closed state.

With reference to FIGS. 2-3, there is shown an example of a solenoid valve assembly 10 that includes a casing 12, a bobbin 14, a coil 16, a body 18, a pole piece 20, an armature 22, a spring 24, a primary seal 26, a secondary seal 28, and an electrical connection 30. FIG. 2 shows the solenoid valve assembly 10 in a closed state, FIG. 3 shows it in an open state. In a generally upright position, the solenoid valve assembly 10 includes an upper axial end 32 and a lower axial end 34 and extends along a longitudinal axis A (of course, it is not necessary for the solenoid valve assembly to be installed in an upright position, as illustrated in FIG. 1). Unless stated otherwise, all references to radial, circumferential and/or axial directions are in relation to the longitudinal axis A.

Casing 12 acts as an exterior housing and encloses much of the solenoid valve assembly 10. According to one example, casing 12 is generally a cylindrical component that is made from a stamped ferromagnetic material (e.g., cold rolled steel, hot rolled steel, annealed steel, etc. with a corrosion resistant coating for an external mount) and includes an upper wall 40, sidewalls 42, an electrical interface feature 44, and a mounting feature 46. The upper wall 40 may be circular and integrally connected to cylindrical sidewalls 42 such that the casing 12 is closed at its upper axial end and open at its lower axial end in order to receive the other components of the solenoid valve assembly 10. The electrical interface feature 44 may include a cutout in the sidewalls 42 that allows the electrical connection 30 to be physically and electrically connected to the coil 16. The mounting feature 46 can be located towards the lower axial end of the casing, as shown, and can include one or more openings to accommodate bolts or other fasteners for mounting the casing 12 to an electric motor and/or other apparatus with which the solenoid valve assembly operates.

Bobbin 14 and coil 16 are common solenoid components that work together to induce an electromagnetic field within the solenoid valve assembly 10. The bobbin 14 may be an over-molded component that is made from a non-ferromagnetic material and is designed to receive the coil 16, which includes a length of electrical wire tightly wound or wrapped around the bobbin 14. The bobbin 14 can prevent environmental moisture, salt, etc. from causing corrosion and it can form a connector shroud. The coil 16 can be made from any suitably conductive material, including copper-based materials (e.g., 18 ohm coil). The combined bobbin 14/coil 16 circumferentially surrounds at least a portion of the body 18, which can act as an electromagnetic core, as explained below. Numerous examples of bobbin/coil winding patterns and techniques, as well as wires of different gauges, materials, number of windings, etc. may be used. The solenoid valve assembly 10 is not limited to any particular bobbin and/or coil embodiment.

Body 18 provides the solenoid valve assembly 10 with various structural features, such as fluid passageways and internal bores for movable parts, as well as electromagnetic properties for controlling the armature 22. In this way, the body 18 may be considered a combination of a traditional structural sleeve and an electromagnetic core. According to one example, body 18 is an elongated and generally cylindrical component that is made from a ferromagnetic material (e.g., cold rolled steel, hot rolled steel, annealed steel, etc.) and includes an upper portion 50, a lower portion 52, an axial bore 54, several ports 56, 58, and a mounting feature 60. It is possible for the body 18 to be constructed from a single or unitary piece of ferromagnetic material, or it may be constructed from multiple pieces or materials that are assembled together. To help with assembly and operation, the body 18 may be open at both its upper and lower axial ends; the upper axial end is open so that the pole piece 20, armature 22 and spring 24 can be inserted into the axial bore 54 during assembly, and the lower axial end is open so that fluid can flow into or out of port 58. It should be pointed out that, unlike many traditional solenoid valve assemblies, the body 18 is designed so that the internal fluid network within the solenoid valve assembly 10 can be sealed with a single seal, such as an internal annular seal 62 (e.g., an O-ring), which reduces the cost and complexity of the assembly.

Upper portion 50 generally refers to the portion of the body 18 that is located above the mounting feature 60 and plays a role in terms of the electromagnetic operation of the solenoid valve assembly 10. According to the illustrated example, the upper portion 50 includes a tapered opening 64 and a cutout 66, both of which are optional. The coil 16 circumferentially surrounds a majority of the upper portion 50, which in turn circumferentially surrounds the pole piece 20, at least some of the armature 22 and the spring 24. This concentric arrangement causes the upper portion 50, with its annular cutout 64 strategically placed at an axial position along an exterior surface of the body 18, to channel or influence the magnetic flux induced within the body 18. The cutout 66, also referred to as a magnetic flux choke, can help establish separate magnetic poles within the body 18.

Lower portion 52 generally refers to the portion of the body 18 that is located below the mounting feature 60 and plays a role in terms of the fluid passageways in the solenoid valve assembly 10. The lower portion 52 may include one or more external annular seals 70, a radial passageway 72 that connects with port 56, an axial passageway 74 that connects with port 58, and a radial groove 76. The external annular seals 70 may be conventional annular seals, like those shown, or they may include a different combination of sealing elements in order to sealingly couple the lower portion 52 of the assembly to an electric motor and/or other apparatus with which the solenoid valve assembly is connected. As its name suggests, the radial passageway 72 is a fluid passageway or channel that is located radially between an outer diameter (OD) of the armature 22 and an inner diameter (ID) of the body 18 at that location. In one possible embodiment, the radial passageway 72 circumferentially extends around all or a section of the lower portion 52 and is in fluid connection with port 56, which can be an inlet and/or an outlet port and can include one or more separate openings in the lower body 52 (e.g., port 56 can include separate openings on different sides of the lower body, as illustrated). The axial passageway 74 is a fluid passageway or channel that axially extends within the lower portion 52 and is in fluid connection with port 58, which can also be an inlet and/or an outlet port. The axial passageway 74 may have a constant inner diameter or it may have a varying inner diameter, such that different diametrical sections are formed with interior shoulders in between. The radial and axial passageways 72, 74 are in fluid communication with one another via the primary seal 26 such that when the primary seal is open the two passageways are connected to one another, and when the primary seal is closed the two passageways are isolated from one another, as explained below in more detail. The radial groove 76, which is an optional feature, is formed on the inner surface of the body 18 and acts as a pressure centering groove that circumferentially surrounds the armature 22 and helps keep it concentrically aligned with the other components of the assembly. The radial groove 76 may be located in the upper portion 50, in the lower portion 52 or at the boundary between the upper and lower portions, as shown.

Axial bore 54 extends along the longitudinal axis A, through both the upper and lower portions 50, 52, and is sized and shaped to receive both the pole piece 20 and the armature 22. As mentioned above, the axial bore 54 is open at its upper axial end to facilitate easy insertion and assembly of the armature 22, the spring 24, and the pole piece 20, in that order. The axial bore 54 may have any number of different features, including those created by its varying inner diameter, such as the annular groove or channel that helps form the radial passageway 72 and the tapered or conical valve seat which forms part of the primary seal 26. Of course, the particular dimensions of the axial bore 54 can vary, depending on the application, but in one non-limiting example the axial bore 54 may have a length of about 20 mm-80 mm, inclusive, and even more preferably about 35 mm-65 mm, inclusive, and it may have an inner diameter of about 5 mm-20 mm, inclusive, and even more preferably about 8 mm-15 mm, inclusive.

Ports 56, 58 may be inlet and/or outlet ports that connect the internal fluid network of the solenoid valve assembly 10 to an external fluid network that may be part of a motor cooling system or the like. According to one possibility, port 56 is a side port that acts as an outlet and is connected to an electric motor M, whereas port 58 is an axial port that acts as an inlet and is connected to a pump P. It should be recognized that the preceding arrangement is not necessary, as ports 56, 58 could be switched and/or configured in any number of different arrangements. It is also possible for ports 56, 58 to include multiple openings per port or for the body 18 to include other ports in addition to or in lieu of ports 56, 58.

Mounting feature 60 is an annular flange or ring and may be used to help fasten or attach the casing 12, the bobbin 14, the electrical connection 30 or a combination thereof to the body 18. The mounting feature 60 may utilize mechanical fastening or mounting means, like bolts, screws, clips, interference fits and other fasteners, or it may be welded, adhered and/or otherwise attached to the other components of the solenoid valve assembly 10. According to the illustrated example, the mounting feature 60 is a ring or washer that is a separate piece from the rest of body 18 (i.e., the body is a two-piece component); in a different example, the mounting feature may be integrally formed with the rest of the body 18 such that the entire body is made as a single component (i.e., a one-piece component). The bobbin 14 is mechanically connected or located on the mounting feature 60, and the mounting feature 60 is magnetically coupled to an interior surface of the sidewalls 42 of the casing 12. In a different example, the mounting feature 60 may act as a magnetic flux return member. Other arrangements are certainly possible.

Pole piece 20 electromagnetically interacts with other components of the solenoid valve assembly 10 in order to open and close the valve. More specifically, when electrical current flows through the coil 16, an electromagnetic field is induced in the solenoid valve assembly 10, including in the pole piece 20 which is a stationary component. The corresponding magnetic flux through the lower or latching surface of the pole piece 20 magnetically attracts the armature 22 and pulls it upwards against the spring bias of spring 24; this opens the solenoid valve assembly 10 at the primary seal 26 (see FIG. 3). Once electrical current stops flowing through the coil 16, the electromagnetic field collapses and the spring bias of spring 24 overcomes the magnetic attraction of the pole piece 22, thereby pushing the armature 22 downwards and away from the pole piece; this closes the solenoid valve assembly 10 at the primary seal 26 (see FIG. 2). According to one example, pole piece 20 is a generally cylindrical component that is machined from a ferromagnetic material (e.g., cold rolled steel, hot rolled steel, annealed steel, etc.) and includes an upper portion 80, a lower portion 82, a closed axial bore 84, and an annular sealing channel 86.

Upper portion 80 generally refers to the portion of the pole piece 20 that is located above the closed axial bore 84 and may be used to help fix the pole piece 20 within the axial bore 54 of the body 18 such that the pole piece is stationary. In one example, the spring 24 provides a spring force or load that prevents the pole piece 20 from falling further into the axial bore 54. In different examples, the upper portion 80 could be welded, adhered, bolted and/or otherwise attached to the body 18 and/or the casing 12 such that the pole piece 20 is stationary. The annular sealing channel 86 is sized and shaped to accommodate the internal annular seal 62. In this particular embodiment, the annular sealing channel 86 and the internal annular seal 62 are located in the upper portion 80, however, this is not required as the axial position of the channel and seal may vary from what is illustrated or, in a different embodiment, these elements could even be located in the interior surface of the body 18. As mentioned above, the internal fluid network within the solenoid valve assembly 10 may be sealed only with the internal annular seal 62, which prevents pressurized fluid from leaking past the seal and out of the body 18.

Lower portion 82 generally refers to the portion of the pole piece 20 that surrounds the closed axial bore 84 and may include a lower or latching surface 94. The latching surface 94 is the lower axial surface of the pole piece 20 and may have an annular shape that circumferentially surrounds the closed axial bore 84. The latching surface 94 is designed to magnetically attract and pull upwards a corresponding latching surface of the armature 22 when the solenoid valve assembly 10 is being opened. In order to create a more intimate metal-to-metal interface with the corresponding latching surface of the armature 22, latching surface 94 may be provided without any plating and/or other surface coatings or layers in order to minimize the physical separation between the opposing metal surfaces, even if only by several or tens of microns. Reducing this physical separation can increase the magnetic attraction between the opposing latching surfaces at the metal-to-metal interface. Other techniques may also be used to improve the intimacy of the metal-to-metal interface, such as polishing or otherwise treating the latching surfaces to make them more smooth, planar, etc.

Closed axial bore 84 is a closed bore or blind hole formed in the lower portion 82 of the pole piece 20 and is designed to accommodate one end of the spring 24. According to the illustrated example, closed axial bore 84 has a generally uniform inner diameter throughout most of its axially extent, but tapers towards the upper end of the bore. The closed axial bore 84 may have an attachment feature 96, such as a groove or hole, for securing an upper end of the spring 24. In a different embodiment, the spring 24 may simply sit in the closed axial bore 84, unattached at its ends, since it is compressed between the pole piece 20 and armature 22. Other features and/or configurations for the closed axial bore 84 are certainly possible.

Armature 22, like the pole piece 20, electromagnetically interacts with other components of the solenoid valve assembly 10 in order to open and close the valve. The armature 22 is a movable core that is able to slide up and down within the axial bore 54 of the body 18. When an electromagnetic field is induced in the solenoid valve assembly 10, the magnetic flux through the latching surface 94 of the pole piece 20 pulls the armature 22 upwards, against the spring bias of spring 24, so that the pole piece and armature contact one another and open the valve, as described above (see FIG. 3). When the electromagnetic field is no longer induced, the spring 24 pushes the armature 22 away from the pole piece 22 and closes the valve (see FIG. 2). In this way, the various components of the solenoid valve assembly 10 convert electrical energy into mechanical movement. In the example illustrated in the drawings, armature 22 is a generally cylindrical or tubular component that is machined from a ferromagnetic material (e.g., cold rolled steel, hot rolled steel, annealed steel, etc.) and includes an upper portion 100, a lower portion 102, and an axial bore 104.

Upper portion 100 generally refers to the top or upper part of the armature 22 that is adjacent to the lower portion 82 of the pole piece 20 and includes a latching surface 110 and a boss 112. The latching surface 110 is the upper axial surface of the armature 22 and may have an annular shape that circumferentially surrounds the axial bore 104. As described above, latching surface 110 may be provided without any plating, surface coatings and/or other surface layers in order to reduce the axial separation between the opposing latching surfaces 94 and 110 and enhance the metal-to-metal interface. The closer the latching surfaces 94 and 110 are to one another, the stronger the magnetic connection between the pole piece 20 and the armature 22. This strong magnetic connection, at least in part, helps enable the peak and hold operation described below, which in turn can help reduce the power consumption of the solenoid valve assembly 10, as will be explained. The boss 112 is an annular protrusion or ring that extends upwards from the latching surface 110 and is sized and shaped to receive an end of spring 24. The axial bore 104 narrows before extending through the middle of the boss 112 so that fluid can flow through the axial bore 104 and into the space between the latching surfaces 94, 110.

Figure 4:
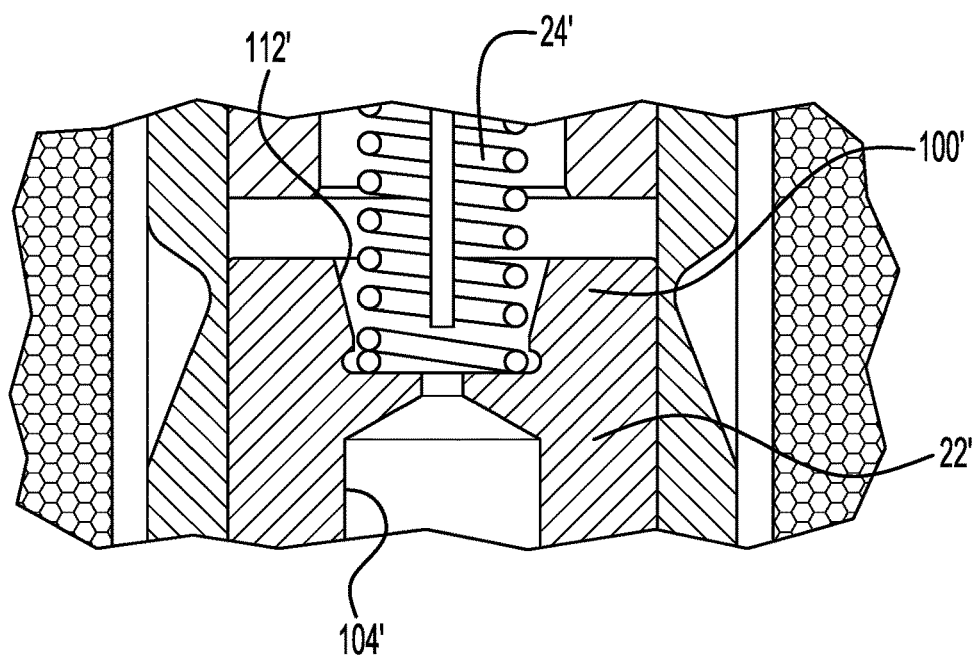
FIG. 4 is an enlarged cross-sectional view of another example of an armature that may be used with the solenoid valve assembly of FIG. 1.

With reference to FIG. 4, there is shown another embodiment of an armature 22' that could be used with the solenoid valve assembly. In this embodiment, the armature 22' has a different upper portion 100' configuration where, instead of having a protruding boss, it has a beveled opening 112' that receives the lower end of the spring 24'.

Lower portion 102 generally refers to the bottom or lower part of the armature 22 that is adjacent to or at least near the ports 56 and/or 58 and includes an engaging surface 114. The engaging surface 114 may be part of the lower axial end of the armature 22. According to one example, the engaging surface 114 includes a primary seal surface at its outer radial end that engages a complementary primary seal seat that is part of the body 18; this sealing arrangement, including the primary seal surface and seat, is described below in conjunction with the primary seal 26. One potential feature of solenoid valve assembly 10 is that it may have a balanced design, both in terms of axial and radial forces. To explain, the surface areas of the latching surface 110 and the engaging surface 114 may be selected so that they are similar in size and/or other characteristics. This way, when pressurized fluid is introduced in the internal fluid network of the solenoid valve assembly and flows into the axial bore 104 as well as the space between pole piece 20 and armature 22, the pressurized fluid that is acting upon latching surface 110 will create a downward axial force and the pressurized fluid that is acting upon the engaging surface 114 will produce an upward axial force, and the two opposing axial forces will be roughly equal to one another; this is what is meant by an axially balanced design. In terms of radial forces, pressurized fluid in the radial groove 76 and/or the secondary seal 28 (i.e., between the outer surface of the armature 22 and the inner surface of the body 18) will exert inward radial forces on the outer surface of the armature 22, but since the inward radial forces are relatively equal and are distributed around the outer circumference of the armature, they generally balance one another out; this is what is meant by a radially balanced design. This arrangement is different than a traditional ball-on-seal design. The solenoid valve assembly 10 may include other features and/or aspects of a balanced design.

Axial bore 104 is an elongated bore or channel that preferably extends the entire axial length of the armature 22, from an upper end with boss 112 to a lower end by axial passageway 74, such that pressurized fluid may flow therethrough. The upper end of the axial bore 104 tapers or narrows down to a smaller passageway before exiting out of boss 112, whereas the lower end of the axial bore may be straight and squared off, as shown, or it may be tapered, chamfered and/or otherwise shaped. Of course, the particular dimensions and angles of the armature 22 can vary, depending on the application, but in one non-limiting example the axial bore 104 may have a length of about 15 mm-45 mm, inclusive, and even more preferably about 25 mm-35 mm, inclusive, and an inner diameter of about 1 mm-4 mm, inclusive, and even more preferably about 1.5 mm-3.5 mm, inclusive.

Spring 24 is located between the pole piece 20 and the armature 22 and exerts an axial force that pushes the two components apart. According to one possibility, spring 24 is a compression spring that is naturally at rest in an extended position. The spring 24 may be located, at an upper end, in the closed axial bore 84 of the pole piece 20 and, at a lower end, around the boss 112. In the embodiment of FIG. 4, the spring 24' may be located, at a lower end, in the beveled opening 112' of the axial bore 104' of the armature 22'. The upper and lower ends of spring 24 may be secured to attachment features 96 and 112, respectively, or the ends of the springs may be unattached such that the spring is simply trapped within the bores. Spring 24 is preferably arranged to push downwardly on the armature 22 and biases the solenoid valve assembly 10 to the closed position (see FIG. 2), although other arrangements are possible.

Primary seal 26 is the main sealing element of the solenoid valve assembly 10 and includes a primary seal seat 130 and a primary seal surface 132. According to one example, the primary seal seat 130 is circumferential surface located on an interior shoulder of the lower portion 52 of the body 18 and it is designed to receive the primary seal surface 132, which is a corresponding circumferential surface located on the lower portion 102 of the armature 22 (e.g., on the engaging surface 114); this forms a corner-on-cone metallic seal. The primary seal seat 130 and the primary seal surface 132 are complementary in terms of their size and shape so that when the solenoid valve assembly is in the closed position, the primary seal surface can be seated on or mate with the primary seal seat and prevent the flow of fluid from one port 56 to another port 58 (see FIG. 2). When the solenoid valve assembly is in the open position, the primary seal surface 132 (also known as a valve face) is lifted off of and spaced from the primary seal seat 130 (also known as a valve seat) so that fluid can flow from one port to the other (i.e., the radial and axial passageways 72, 74 would be in fluid connection) (see FIG. 3). As its name suggests, the primary seal 26 is the main sealing mechanism for the solenoid valve assembly 10. The exact geometric shape and size of the primary seal seat and/or surface can vary, depending on the application, but in one non-limiting example the primary seal seat 130 has a conical shape (e.g., a chamfer set at an angle of about 30°-50°, inclusive, or more preferably about 35°-45°, inclusive), and the primary seal surface 132 has a radiused corner (e.g., a radius between about 0.1 mm-0.3 mm, inclusive). It should be noted that it is possible for the primary seal seat and the primary seal surface to be switched, so that the primary seal seat 130 is located on the armature 22 and the primary seal surface 132 is located on the body 18. In the present embodiment, the primary seal seat 130 is integral with the body 18 and the primary seal surface 132 is integral with the armature 22 such that relatively high levels of concentricity can be achieved, which typically leads to less leakage. Other shapes and dimensions, as well as additional sealing elements, are certainly possible.

Secondary seal 28 is an additional sealing element of the solenoid valve assembly 10 and is a vertical seal located between the armature 22 and the body 18. According to the embodiment shown in the drawings, the secondary seal 28 is a low clearance, extended length, vertical seal that is established at the sliding interface or junction between the outer surface of the armature 22 and the inner surface of the body 18. As far as the secondary seal 28 being low clearance, the total diametric clearance (i.e., the difference between the inner diameter of the body 18 and the outer diameter of the armature 22) may be less than 0.20 mm, and is preferably between 0.05 mm and 0.10 mm, inclusive. Since the radial clearance is one half the total diametric clearance, the radial clearance on each side of the secondary seal 28 may be less than 0.10 mm, and is preferably between 25 μm and 50 μm, inclusive. In terms of the secondary seal being extended length, the total axial length of the secondary seal 28 may be greater than 15 mm, and is preferably greater than 20 mm (e.g., about 24 mm). Due to its low clearance and extended length, in combination with other features of the solenoid valve assembly 10, the secondary seal 28 is able to provide adequate sealing without requiring additional, costly sealing elements like sealing rings in grooves or pressure blocks. In this sense, secondary seal 28 may be a "simple metal-to-metal sliding seal" which, as used herein, broadly refers to any seal or sealing arrangement between two metal components, where at least one of the two metal components slides with respect to the other metal component, and where no additional non-metal sealing components, like a sealing ring or a pressure block, are used. Skilled artisans will appreciate that a simple metal-to-metal sliding seal, like secondary seal 28, may not prevent or stop all fluid leakage, but provides enough sealing to be employed in certain applications, like low pressure applications (e.g., those where fluid pressures are less than or equal to 5 bar).

Electrical connection 30 provides electrical power to the solenoid valve assembly 10 and can provided according to any embodiment known in the art. In the illustrated embodiment, the electrical connection 30, also referred to as a mating connector, includes a receptacle for physically and electrically receiving an electrical input (not shown) and connecting it to the coil 16, as is widely known in the art. Other electrical connections and/or receptacles are certainly possible.

In operation, the solenoid valve assembly 10 can transition between a closed state (FIG. 2) and an open state (FIG. 3) in order to control the flow of a fluid, such as oil, from one port 56, 58 to another. Starting with the closed state in FIG. 2, the electrical connection 30 is not providing electrical energy to the coil 16, therefore, there is no electromagnetic field induced within the solenoid valve assembly 10. In this scenario, the spring force from spring 24 is pushing the armature 22 downwards against body 18 and, more particularly, the spring is pushing the primary seal surface 132 against the primary seal seat 130 so that a corner-on-cone metallic seal is established at the primary seal 26. The radial balance of the assembly, coupled with the self-centering nature of the corner-on-cone metallic seal, helps seal the assembly so that pressurized oil cannot readily flow from an inlet port 58 to an outlet port 56. Furthermore, the axial balance of the assembly, where a comparable amount of axial forces due to fluid pressure are pushing down on the armature 22 as are pushing up on the armature, helps maintain the assembly in its desired operational state.

When it is time to transition to an open state (FIG. 3), the electrical connection 30 provides the coil 16 with electrical energy which energizes it and creates an electromagnetic field in the solenoid valve assembly 10, including in the pole piece 20. The resulting magnetic flux through the latching surface 94 of the pole piece 20 magnetically attracts the latching surface 110 of the armature 22 and pulls the armature upwards against the spring force of spring 24. This causes the armature 22, and hence the primary seal surface 132, to lift off of the primary seal seat 130 and create a fluid path from inlet port 58 to outlet port 56. In one example, the solenoid valve assembly 10 employs a peak-and-hold technique to maintain the valve in the open state, yet do so while drawing a minimum amount of electrical current.

Figure 5:
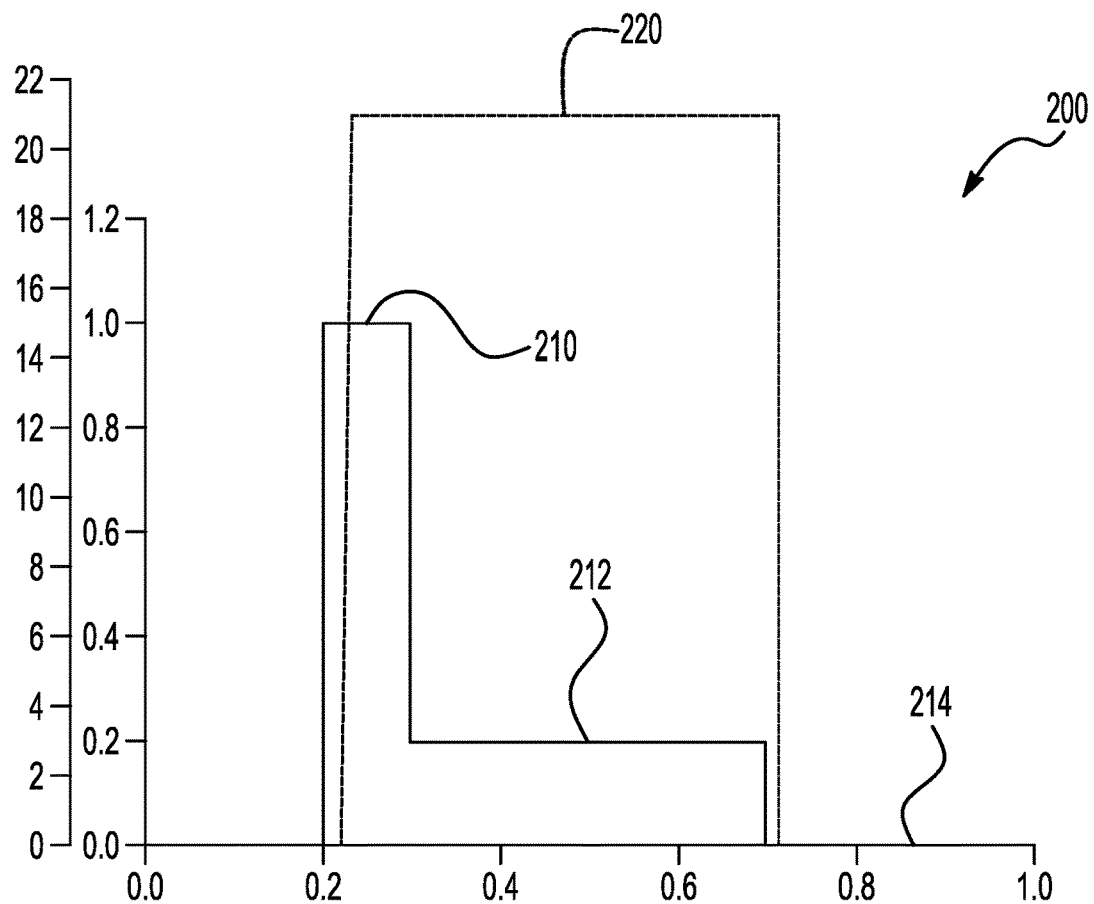
FIG. 5 is a timing graph illustrating the operation of the solenoid valve assembly with time on the x-axis and electrical current and flowrate on the y-axis.

Turning to FIG. 5, there is shown a basic or representative graph 200 that illustrates the peak-and-hold technique. Time (seconds) is shown in the x-axis and electrical current (amps) is shown on the y-axis. During an initial or peak phase 210, the amount of electrical current supplied to the coil 16 is at a peak or maximum and lasts for a relatively short period of time; in this non-limiting example, the peak current may be between 0.5 amps and 1.5 amps, inclusive, or even more preferably between 0.5 amps and 1.0 amp, inclusive (e.g., about 0.7 amps), and it may be provided or sustained for between 0.01 seconds and 0.4 seconds, inclusive (e.g., about 0.1 seconds). The electrical current supplied during the peak phase 210 creates an electromagnetic field and corresponding magnetic flux that is sufficient to overcome the spring force of spring 24, as well as any drag and/or other frictional forces that may be impeding the upward sliding movement of the armature 22. Once the opposing latching surfaces 94 and 110 of the pole piece 20 and armature 22, respectively, contact one another and establish a metal-to-metal interface, less magnetic flux may be needed to keep the metal latching surfaces 94 and 110 in contact with one another. Thus, the amount of electrical current supplied to the coil 16 can be reduced during a subsequent hold phase 212, while still keeping the primary seal 26 open. During the hold phase 212, the current may be between 0.1 amps and 0.4 amps, inclusive, and even more preferably between 0.1 amps and 0.3 amps, inclusive (e.g., about 0.15 amps) and it may be provided for between 0.3 seconds and 1.0 second, inclusive, (e.g., about 0.5 seconds). An off phase 214 where no electrical current is supplied to the coil 16 can follow the hold phase 212, during which the electromagnetic field collapses, the magnetic flux through the latching surfaces 94 and 110 diminishes, and the spring force of spring 24 pushes the armature 22 downward so that the primary seal 26 causes the solenoid valve assembly to transition to the off state. Overlaid on graph 200 is a separate curve 220 that shows the corresponding flow rate when the solenoid valve assembly uses the peak-and-hold technique (time (seconds) is still on the x-axis and flowrate (liters/minute) is on the y-axis). As shown, the solenoid valve assembly provides a high flow rate when in the open state that may be greater than or equal to 15 liters/minute at 2 Bar of pressure, and may even be greater than or equal to 20 liters/minute at 2 Bar of pressure.

The current or power level during the hold phase 212 is less than that of the peak phase 210 and, more preferably, the current level of the hold phase 212 is less than one-half, one-fourth or even one-fifth of the current level of the peak phase 210. The length of time or duration of the hold phase 212 is greater than that of the peak phase 210 and, more preferably, the duration of the hold phase 212 is greater than two times, three times or even four times the duration of the peak phase 210. By supplying the coil 16 with higher current only during the initial peak phase 210 and then dropping to a much lower current level during the subsequent hold phase 212, which is for a longer period of time, the solenoid valve assembly 10 is able to consume less power and, thus, be more energy efficient. Traditional solenoid valve assemblies typically energize a coil with only one current level (i.e., the coil is either on or off), but do not modulate, manipulate and/or vary the current level when energizing the coil.

Generally speaking, the solenoid valve assembly 10 is well suited for low pressure applications (e.g., those where fluid pressures are less than or equal to 5 bar), such as low pressure, low-moderate leakage, high flow, two way, on/off valves for controlling the flow of fluids, such as oil. In one such application, the solenoid valve assembly 10 closes and holds pressurized oil from a pump and then releases and dumps the oil when requested. Of course, the solenoid valve assembly 10 could be used in other applications as well.

It is to be understood that the foregoing description is not a definition of the invention, but is a description of one or more exemplary illustrations of the invention. The invention is not limited to the particular example(s) disclosed herein, but rather is defined solely by the claims below. Furthermore, the statements contained in the foregoing description relate to particular exemplary illustrations and are not to be construed as limitations on the scope of the invention or on the definition of terms used in the claims, except where a term or phrase is expressly defined above. Various other examples and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that that the listing is not to be considered as excluding other, additional components or items. Other terms are to be construed using their broadest reasonable meaning unless they are used in a context that requires a different interpretation.

The invention claimed is:

1. A solenoid valve assembly for controlling the flow of fluids, comprising:
a casing;
a bobbin and a coil at least partially surrounded by the casing, the coil is configured to establish an electromagnetic field when an electrical current flows through the coil;
a body at least partially surrounded by the coil, the body includes an upper portion, a lower portion, an axial bore, and first and second ports;
a pole piece stationarily located within the axial bore of the body, the pole piece includes a ferromagnetic material;
an armature slidingly located within the axial bore of the body, the armature includes a ferromagnetic material;
a spring biased to push the pole piece and the armature apart, the pole piece and the armature are configured to be magnetically attracted to one another against the bias of the spring when the electromagnetic field is established;
a primary seal located between the first port and the second port, the primary seal includes a primary seal surface and a primary seal seat, the first port and the second port are in fluid communication with one another when the primary seal is open, and the first port and the second port are in fluid isolation from one another when the primary seal is closed; and
a secondary seal established at a sliding junction between an outer surface of the armature and an inner surface of the axial bore of the body, wherein the secondary seal is: a low clearance seal with a radial clearance on each side that is less than 0.10 mm, an extended length seal with a total axial length that is greater than 15 mm, and a simple metal-to-metal sliding seal without any sealing rings, pressure blocks, or other non-metal sealing components located along the entire sliding junction between the outer surface of the armature and the inner surface of the axial bore of the housing.

2. The solenoid valve assembly of claim 1, wherein the upper portion of the body acts as an electromagnetic core and includes a cutout, the cutout is located at an axial position along an outer surface of the body and helps establish separate magnetic poles within the body.

3. The solenoid valve assembly of claim 1, wherein the lower portion of the body acts as a structural sleeve and includes a radial passageway connected to the first port and an axial passageway connected to the second port, the radial passageway is a fluid passageway or channel that circumferentially extends around at least a section of the lower portion and is in fluid connection with the first port, the axial passageway is a fluid passageway or channel that axially extends within at least a section of the lower portion and is in fluid connection with the second port.

4. The solenoid valve assembly of claim 1, wherein the body further includes a radial groove located between an outer surface of the armature and an inner surface of the body, the radial groove circumferentially surrounds the armature and is a pressure centering groove so as to maintain the armature in a concentric alignment and provide a radially balanced design.

5. The solenoid valve assembly of claim 1, wherein the pole piece includes an upper portion, a lower portion with a latching surface, and a closed axial bore, the spring is at least partially located within the closed axial bore of the pole piece.

6. The solenoid valve assembly of claim 5, wherein the latching surface of the lower portion is an annular surface that circumferentially surrounds an opening to the closed axial bore, the latching surface magnetically attracts the armature and pulls the armature towards the pole piece when the electromagnetic field is established.

7. The solenoid valve assembly of claim 6, wherein the latching surface is provided without any plating, surface coatings or surface layers to create a more intimate metal-to-metal interface with a corresponding latching surface of the armature thereby minimizing a physical separation between the opposing latching surfaces.

8. The solenoid valve assembly of claim 1, wherein one of the body or the pole piece includes an annular sealing channel and an internal annular seal, the internal annular seal is located within the annual sealing channel and seals an internal fluid network within the solenoid valve assembly with just the internal annular seal.

9. The solenoid valve assembly of claim 1, wherein the armature includes an upper portion with a latching surface and a lower portion, the latching surface of the upper portion is magnetically attracted to the pole piece and is pulled towards the pole piece when the electromagnetic field is established.

10. The solenoid valve assembly of claim 9, wherein the upper portion of the armature further incudes a protruding boss that receives an end of the spring, an axial bore of the armature extends through the protruding boss so that pressurized fluid can flow through the armature and into a space located between the armature and the pole piece.

11. The solenoid valve assembly of claim 9, wherein the upper portion of the armature further incudes an opening that receives an end of the spring, an axial bore of the armature extends through the opening so that pressurized fluid can flow through the armature and into a space located between the armature and the pole piece.

12. The solenoid valve assembly of claim 1, wherein the primary seal seat is a circumferential surface located on an interior shoulder of the lower portion of the body, the primary seal surface is a circumferential surface located on a lower portion of the armature, the primary seal seat and the primary seal surface together form a corner-on-cone metallic seal.

13. The solenoid valve assembly of claim 12, wherein the primary seal seat has a conical shape with a chamfer set at an angle of between 30°-50°, inclusive, and the primary seal surface has a radiused corner with a radius between 0.1 mm-0.3 mm, inclusive.

14. The solenoid valve assembly of claim 1, wherein an engaging surface of a lower portion of the armature has a similar area as a latching surface of an upper portion of the armature so as to provide an axially balanced design, when pressurized fluid is introduced in an internal network of the solenoid valve assembly, the axially balanced design causes an axial force exerted against the engaging surface to offset an axial force exerted against the latching surface.

15. The solenoid valve assembly of claim 1, wherein the solenoid valve assembly is configured such that:
  during a peak phase, a first amount of electrical current is conducted through the coil and a latching surface of the pole piece magnetically attracts a latching surface of the armature such that the latching surfaces contact one another and open the primary seal; and
  during a hold phase which follows the peak phase, a second amount of electrical current is conducted through the coil and the latching surfaces continue to contact one another such that the primary seal remains open, wherein the second amount of electrical current is less than the first amount of electrical current.

* * * * *